United States Patent
Chu et al.

(10) Patent No.: US 11,716,770 B2
(45) Date of Patent: Aug. 1, 2023

(54) DEVICE AND METHOD FOR MULTI-LINK OPERATIONS

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US); Huiling Lou, Sunnyvale, CA (US); Rui Cao, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 65 days.

(21) Appl. No.: 17/523,805

(22) Filed: Nov. 10, 2021

(65) Prior Publication Data

US 2022/0150958 A1 May 12, 2022

Related U.S. Application Data

(60) Provisional application No. 63/121,507, filed on Dec. 4, 2020, provisional application No. 63/112,545, filed on Nov. 11, 2020.

(51) Int. Cl.
  *H04W 74/08* (2009.01)
  *H04W 72/12* (2023.01)
  *H04W 84/12* (2009.01)
  *H04W 80/02* (2009.01)

(52) U.S. Cl.
  CPC ......... *H04W 74/085* (2013.01); *H04W 72/12* (2013.01); *H04W 74/0866* (2013.01); *H04W 80/02* (2013.01); *H04W 84/12* (2013.01)

(58) Field of Classification Search
  CPC .............................. H04W 72/12; H04W 84/12
  USPC ........................................................ 370/329
  See application file for complete search history.

(56) References Cited

PUBLICATIONS

IEEE, "IEEE P802.11be™/D1.0", Part 11: Wireless LAN Medium Access Control (MAC) and Physical Layer (PHY) Specifications, Amendment 8: Enhancements for extremely high throughput (EHT), Section 35.3.14.5 and 35.3.14.6, (2021), 635 pgs.

*Primary Examiner* — Angel T Brockman (57) ABSTRACT

Embodiments of a device and a method for multi-link operations are disclosed. In an embodiment, a device includes a processor configured to perform a first backoff operation on a first link and a second backoff operation on a second link of a multi-link device (MLD) that has a non-simultaneous transmission and reception capability (NSTR MLD), and transmit a first Physical Layer Convergence Protocol (PLCP) Protocol Data Unit (PPDU) on the first link at a first start time after the first backoff operation and a second PPDU on the second link at a second start time after the second backoff operation.

20 Claims, 7 Drawing Sheets

DEVICE AND METHOD FOR MULTI-LINK OPERATIONS

CROSS-REFERENCE TO RELATED APPLICATIONS

This application is entitled to the benefit of U.S. Provisional Patent Application Ser. No. 63/112,545, filed on Nov. 11, 2020, and U.S. Provisional Patent Application Ser. No. 63/121,507, filed on Dec. 4, 2020, each of which is incorporated by reference herein.

BACKGROUND

In multi-link operations, wireless devices, e.g., multi-link devices (MLDs), can execute various wireless operations, such as coordinate some features or operations for devices in a multi-link operation via one or more links. As an example, a wireless device may transmit frames on a link after a backoff counter becomes zero. However, because some wireless devices may simultaneously transmit frames on multiple links, backoff operations for simultaneous transmissions may also need to be defined for when multiple backoff counters on a link are zero.

SUMMARY

Embodiments of a device and a method for multi-link operations are disclosed. In an embodiment, a device includes a processor configured to perform a first backoff operation on a first link and a second backoff operation on a second link of a multi-link device (MLD) that has a non-simultaneous transmission and reception capability (NSTR MLD), and transmit a first Physical Layer Convergence Protocol (PLCP) Protocol Data Unit (PPDU) on the first link at a first start time after the first backoff operation and a second PPDU on the second link at a second start time after the second backoff operation.

In an embodiment, a difference between the first start time and the second start time is no more than a Receive-Transmit Turnaround Time (aRxTxTurnaroundTime).

In an embodiment, a difference between the first start time and the second start time is no more than 4 microseconds (μs).

In an embodiment, a first backoff counter of the first backoff operation becomes zero after a first backoff counter of the second backoff operation and a second backoff counter of the second backoff operation have become zero.

In an embodiment, the first backoff counter of the second backoff operation and the second backoff counter of the second backoff operation become zero at different times.

In an embodiment, the first backoff counter of the second backoff operation and the second backoff counter of the second backoff operation become zero at a same time.

In an embodiment, the first PPDU includes a first Aggregated-Media Access Control (MAC) Protocol Data Unit (MPDU) (A-MPDU) with frames from a first Access Category (AC), and the second PPDU includes a second A-MPDU with frames from a second AC.

In an embodiment, the processor is configured to perform another backoff operation on the second link for an AC that is not included in the second PPDU, and where a Contention Window (CW) of the AC (CW[AC]) and a Quality of Service (QoS) Short Reply Counter (QSRC) of the AC (QSRC[AC]) are unchanged.

In an embodiment, the processor is configured to perform another backoff operation on the second link for an AC that is not included in the second PPDU after a QSRC[AC] is increased by one and a CW[AC] is doubled.

In an embodiment, the CW[AC] is doubled if the CW[AC] is less than a max CW of the AC (CWmax[AC]).

In an embodiment, the CW[AC] is set to a minimum CW of the AC (CWmin[AC]) if the QSRC[AC] reaches a threshold value.

In an embodiment, a first backoff counter of the first backoff operation becomes zero after a first backoff counter of the second backoff operation and a second backoff counter of the second backoff operation have become zero, and where the first PPDU includes a first A-MPDU with frames from a first AC and the second PPDU includes a second A-MPDU with frames from a second AC.

In an embodiment, the second A-MPDU with frames from the second AC corresponds to at least one of the first backoff counter of the second backoff operation and the second backoff counter of the second backoff operation.

In an embodiment, the processor is configured to perform another backoff operation on the second link once a backoff counter on the first link becomes zero to break a deadlock that occurs after the first backoff operation and the second backoff operation.

In an embodiment, the processor is configured to perform another backoff operation on the second link once the second link becomes idle to break a deadlock that occurs after the first backoff operation and the second backoff operation.

In an embodiment, the first backoff operation includes a backoff counter for a corresponding AC and the second backoff operation includes another backoff counter for another corresponding AC.

In an embodiment, the device includes a first station (STA), STA1, that performs the first backoff operation on the first link, and a second STA, STA2, that performs the second backoff operation on the second link.

In an embodiment, the processor is configured to operate according to an Institute of Electrical and Electronics Engineers (IEEE) 802.11be communication protocol.

A method for multi-link operations is also disclosed. The method involves performing, by an NSTR MLD, a first backoff operation on a first link and a second backoff operation on a second link, and transmitting, by the NSTR MLD, a first PPDU on the first link at a first start time after the first backoff operation and a second PPDU on the second link at a second start time after the second backoff operation.

Another method for multi-link operations is also disclosed. The method involves performing, by an NSTR MLD, a first backoff operation on a first link and a second backoff operation on a second link, where performing the first backoff operation and the second backoff operation includes a first STA, STA1, performing the first backoff operation on the first link, and a second STA, STA2, performing the second backoff operation on the second link, and transmitting, by STA1 and STA2, a first PPDU on the first link at a first start time after the first backoff operation and a second PPDU on the second link at a second start time after the second backoff operation.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a multi-link communications system, a wireless device, e.g., a multi-link device (MLD) (e.g., an access point (AP) MLD or a non-AP station (STA) MLD) that has a non-simultaneous transmission and reception capability (NSTR MLD) may exchange data frames, management frames, or control frames (e.g., data Media Access Control (MAC) Protocol Data Units (MPDUs), management MPDUs, or control MPDUs encapsulated in Physical Layer Convergence Protocol (PLCP) Protocol Data Units (PPDUs)) with at least one MLD associated with the NSTR MLD. In some embodiments, frames may correspond to an Access Category (AC), such that the AC may be one of four categories: AC Voice (AC_VO), AC Video (AC_VI), AC Best Effort (AC_BE), or AC Background (AC_BK). As described herein, an "NSTR MLD" may be an AP MLD or a non-AP STA MLD that is unable to simultaneously transmit and receive frames on multiple links, e.g., an NSTR AP MLD or an NSTR non-AP STA MLD. In addition, the MLD associated with the NSTR MLD may be an NSTR MLD or an MLD that has a simultaneous transmission and reception capability (STR MLD). As described herein, an "STR MLD" may be an AP MLD or a non-AP STA MLD that is able to simultaneously transmit and receive frames on multiple links, e.g., an STR AP MLD or an STR non-AP STA MLD. Furthermore, as described herein, "simultaneous" and/or "simultaneously" may be defined as occurring concurrently, as occurring in no more than a Receive-Transmit Turnaround Time (aRxTxTurnaroundTime), or as occurring in no more than 4 microseconds (µs).

In an embodiment, an MLD (e.g., an NSTR MLD) may include two or more access points (APs) or non-AP stations (STAs) on links associated with the MLD. As described herein, non-AP STAs (e.g., STAs) of an NSTR MLD may alternatively be APs. In addition, as described herein, APs of an MLD may alternatively be non-AP STAs (e.g., STAs). As an example, an AP or a non-AP STA of an MLD (e.g., NSTR MLD) may have one associated link. In addition, the associated link may have a dedicated radio or share a radio with other link(s), such that a radio may switch to a link for frame exchanges on the link.

An NSTR MLD may be configured to operate with associated MLDs according to a communication protocol. For example, the communication protocol may be an Extremely High Throughput (EHT) communication protocol, or an Institute of Electrical and Electronics Engineers (IEEE) 802.11be communication protocol. Features of wireless communications and multi-link communications systems operating in accordance with the EHT communication protocol and/or next-generation communication protocols may be referred to herein as "non-legacy" features. In some embodiments of the multi-link communications system described herein, different associated APs of an MLD (or STAs of an MLD) within range of a STA of an NSTR MLD (or an AP of an NSTR MLD) operating according to the EHT communication protocol are configured to operate according to at least one other communication protocol, which defines operation in a Basic Service Set (BSS) with the STA of the NSTR MLD (or the AP of the NSTR MLD), but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

Figure 1:
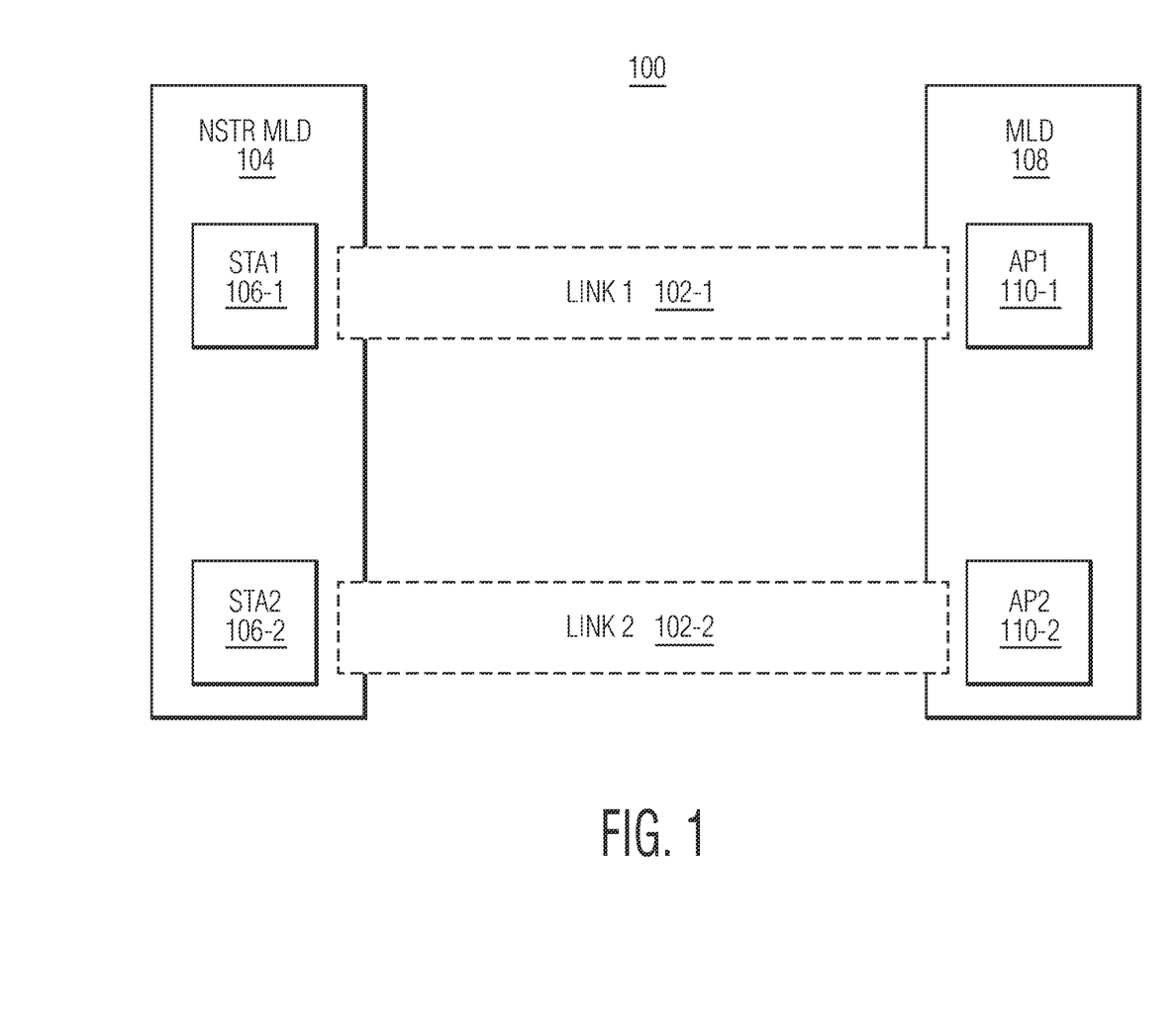
FIG. 1 depicts a multi-link communications system.

FIG. 1 depicts a multi-link communications system 100 that is used for wireless (e.g., Wi-Fi) communications. In the embodiment depicted in FIG. 1, the multi-link communications system includes one NSTR MLD (e.g., an NSTR AP MLD or an NSTR non-AP MLD), implemented as NSTR MLD 104, and one MLD (e.g., an NSTR AP MLD, an NSTR non-AP MLD, an STR AP MLD, or an STR non-AP MLD), implemented as MLD 108. The multi-link communications system can be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes a single NSTR MLD with multiple MLDs, or multiple NSTR MLDs with more than one MLD. In another example, although the multi-link communications system is shown in FIG. 1 as being connected in a certain topology, the network topology of the multi-link communications system is not limited to the topology shown in FIG. 1.

In the embodiment depicted in FIG. 1, the NSTR MLD 104 includes two non-AP STAs, STA1 106-1 and STA2 106-2. In some embodiments, a common part of the NSTR MLD 104 implements upper layer MAC functionalities (e.g., beacon creation, MLD association establishment, reordering of frames, etc.) and a link specific part of the NSTR MLD 104, i.e., the STAs 106-1 and 106-2, implement lower layer MAC functionalities (e.g., backoff, frame transmission, frame reception, etc.). The STAs 106-1 and 106-2 may be implemented in hardware (e.g., circuits), software, firmware, or a combination thereof. The STAs 106-1 and 106-2 may be fully or partially implemented as an integrated circuit (IC) device. In some embodiments, the STAs 106-1 and 106-2 may be compatible with at least one wireless local area network (WLAN) communications protocol (e.g., at least one IEEE 802.11 protocol). For example, the STAs 106-1 and 106-2 may be compatible with the IEEE 802.11be protocol, such that the NSTR MLD 104 operates according to the IEEE 802.11be communication protocol.

In some embodiments, an NSTR MLD (e.g., NSTR MLD 104) connects to a local area network (e.g., a LAN) and/or to a backbone network (e.g., the Internet) through a wired connection and wirelessly connects to wireless APs (or STAs), for example, through one or more WLAN communications protocols, such as the IEEE 802.11 protocol. In some embodiments, an NSTR radio (e.g., an NSTR radio related to STA1 106-1 and/or STA2 106-2) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented in a device that includes a processor, for example, a microcontroller, a host processor, a host, a digital signal processor (DSP), or a central processing unit (CPU), or a combination thereof, which can be integrated in a corresponding transceiver. In some embodiments, each of the STAs 106-1 or 106-2 of the NSTR MLD 104 may operate in a different BSS operating channel. For example, STA1 106-1 may operate in a 320 MHz BSS operating channel at 6 GHz band and STA2 106-2 may operate in a 160 MHz BSS operating channel at 5 GHz band. Although the NSTR MLD 104 is shown in FIG. 1 as including two STAs, other embodiments of the NSTR MLD 104 may include more than two STAs that use more than two radios. In addition, although the NSTR MLD 104 is shown in FIG. 1 as including STAs, the STAs may alternatively be APs.

In the embodiment depicted in FIG. 1, the MLD, implemented as MLD 108, includes two APs, AP1 110-1 and AP2 110-2. The APs 110-1 and 110-2 may be implemented in hardware (e.g., circuits), software, firmware, or a combination thereof. The APs 110-1 and 110-2 may be fully or partially implemented as an IC device. In some embodiments, the APs 110-1 and 110-2 are part of the MLD 108, such that the MLD may be a communications device that wirelessly connects to a wireless NSTR MLD. For example, the MLD 108 may be implemented in a laptop, a desktop personal computer (PC), a mobile phone, or other communications device that supports at least one WLAN communications protocol. In some embodiments, the MLD 108 is a communications device compatible with at least one IEEE 802.11 protocol (e.g., the IEEE 802.11be protocol). In some embodiments, the MLD 108 implements a common MAC data service interface and the APs 110-1 and 110-2 implement a lower layer MAC data service interface. Although the MLD 108 is shown in FIG. 1 as including two APs, other embodiments of the MLD 108 may include one AP or more than two APs that use more than two radios. In addition, although the MLD 108 is shown in FIG. 1 as including APs, the APs may alternatively be STAs.

In some embodiments, the NSTR MLD 104 and/or the MLD 108 can identify which communication links support multi-link operation during a multi-link operation setup phase and/or exchange information regarding multi-link capabilities during the multi-link operation setup phase. In some embodiments, each of the APs 110-1 and 110-2 of the MLD 108 may operate in a different frequency band. For example, AP1 110-1 may operate in the 2.4 GHz frequency band and AP2 110-2 may operate in the 5 GHz frequency band. In some embodiments, each AP includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, a CPU, or a combination thereof, which can be integrated in a corresponding transceiver.

In the embodiment depicted in FIG. 1, the NSTR MLD 104 communicates with the MLD 108 via two communication links, e.g., link1 102-1 and link2 102-2. For example, each of the STAs 106-1 or 106-2 communicates with APs 110-1 or 110-2 via corresponding communication links 102-1 or 102-2. In an embodiment, a communication link (e.g., link1 102-1 or link2 102-2) may include a BSS operating channel established by a STA of an NSTR MLD (or an AP of an NSTR MLD) (e.g., STA1 106-1 or STA2 106-2) that features multiple 20 MHz channels used to transmit frames between an NSTR MLD and an MLD. In some embodiments, a 20 MHz channel may be a punctured 20 MHz channel or an unpunctured 20 MHz channel. In addition, although the NSTR MLD 104 communicates (e.g., wirelessly communicates) with the MLD 108 via links 102-1 and 102-2, in other embodiments, the NSTR MLD 104 may communicate (e.g., wirelessly communicate) with the MLD 108 via more than two communication links.

In some embodiments, an MLD (e.g., an NSTR MLD or an STR MLD) transmits PPDUs to an associated MLD (e.g., an NSTR MLD or an STR MLD) on multiple links (e.g., link1 102-1 and link2 102-2), such that a PPDU transmitted by the MLD to the associated MLD may have a start time and an end time. As described herein, a "start time" may be defined as a time at which an MLD begins to transmit a PPDU, and an "end time" may be defined as a time at which the MLD finishes transmitting the PPDU. In an embodiment, a first PPDU transmitted on a first link has a first start time and a first end time, and a second PPDU transmitted on a second link has a second start time and a second end time.

According to conventional wireless communications, the first end time of the first PPDU and the second end time of the second PPDU can be the same or different depending on whether the PPDUs solicit responding PPDUs. When the PPDUs are addressed to an NSTR MLD and solicit responding PPDUs, the first end time of the first PPDU and the second end time of the second PPDU may need to be the same so that the NSTR MLD can transmit the responding PPDUs simultaneously. For example, if the first PPDU and the second PPDU include trigger frames (solicit responding PPDUs) with a Carrier Sensing (CS) Required subfield set to one, then the first end time cannot be more than aRxTxTurnaroundTime or 4 µs earlier than the second end time. When the PPDUs are addressed to an NSTR MLD and do not solicit responding PPDUs, the first end time of the first PPDU and the second end time of the second PPDU can be the same or different. For example, if the first PPDU and the second PPDU do not include trigger frames with the CS Required subfield set to one, then a difference between the first end time and the second end time cannot be more than a Short Interframe Space (SIFS) Time (aSIFSTime) plus a Signal Extension (aSignalExtension) divided by two ((aSIFSTime+aSignalExtension)/2) or 8 µs.

In an embodiment, the first start time of the first PPDU and the second start time of the second PPDU can be the same or different. As an example, when an NSTR MLD transmits multiple PPDUs on more than one link, start times of the PPDUs on different links may need to be the same. In such an example, the start times of the PPDUs are the same if a difference between the start times is less than a threshold value. As another example, an NSTR MLD (e.g., STAs of an NSTR MLD) may either transmit one PPDU on one link (e.g., link1 102-1) or transmit multiple PPDUs on multiple links (e.g., link1 102-1 and link2 102-2). The NSTR MLD can transmit one PPDU on one link when a backoff counter of other links is not zero. If the NSTR MLD prefers to transmit PPDUs on multiple links, then the PPDUs are transmitted when backoff counters of the multiple links become zero at a same time, or when the backoff counter of one link becomes zero while the backoff counter of another link is zero and a medium (e.g., a channel medium, a link, a band, etc.) is idle. As described herein, a "backoff counter" may feature a slot-based backoff counter which counts down from a Contention Window (CW) of an AC (CW[AC]) to zero via values from slot boundaries or time slots, and may correspond to an AP or a non-AP STA of an MLD (e.g., NSTR MLD). In such an example, start times of simultaneously transmitted PPDUs by the NSTR MLD may not need to be exactly the same. However, because the NSTR MLD may not be able to transmit a PPDU on one link while performing a backoff operation (e.g., Clear Channel Assessment (CCA) sensing) on another link, a difference between the start times of the PPDUs cannot be too big.

In conventional backoff operations, a STA of an NSTR MLD (or an AP of an NSTR MLD) may follow channel access procedures when simultaneously transmitting PPDUs on multiple links. In one embodiment, a STA of an NSTR MLD (or an AP of an NSTR MLD) may initiate transmission on a link when a medium is idle and either (i) a backoff counter of the STA of the NSTR MLD (or the AP of the NSTR MLD) becomes zero on a slot boundary of a backoff operation, or (ii) the backoff counter of the STA of the NSTR MLD (or the AP of the NSTR MLD) is already zero and a backoff counter of another STA (or AP) associated with the NSTR MLD becomes zero on a slot boundary of a backoff operation. In another embodiment, when a backoff counter of a STA of an NSTR MLD becomes zero, the STA may choose to not transmit and to keep the backoff counter at zero. In yet another embodiment, if a backoff counter of a STA of an NSTR MLD related to an AC has already become zero, the STA may perform a new backoff operation where a CW[AC] and a Quality of Service (QoS) Short Retry Counter (QSRC) of the AC (QSRC[AC]) are unchanged. Thus, although backoff operations for simultaneous transmissions on multiple links may be defined, backoff operations for simultaneous transmissions by an NSTR MLD may also need to be defined for when multiple backoff counters related to multiple ACs on a non-AP STA in a link are zero.

In accordance with an embodiment of the invention, a technique for multi-link operations involves performing, by an NSTR MLD, a first backoff operation on a first link and a second backoff operation on a second link, and transmitting, by the NSTR MLD, a first PPDU on the first link at a first start time after the first backoff operation and a second PPDU on the second link at a second start time after the second backoff operation. In some embodiments, the technique may be implemented by a communications device (e.g., an NSTR MLD). For example, a device may include a processor configured to perform a first backoff operation on a first link and a second backoff operation on a second link of an NSTR MLD, and transmit a first PPDU on the first link at a first start time after the first backoff operation and a second PPDU on the second link at a second start time after the second backoff operation. In an embodiment, a difference between the first start time and the second start time is no more than aRxTxTurnaroundTime or 4 µs. By transmitting the first PPDU and the second PPDU after performing the first backoff operation and the second backoff operation, such that the difference between the first start time and the second start time is no more than aRxTxTurnaroundTime or 4 µs, multi-link operations may be performed more efficiently and simultaneous transmissions when multiple backoff counters on a link are zero may be defined.

Examples of techniques that may be used by an NSTR MLD to simultaneously transmit PPDUs on multiple links when multiple backoff counters on a link are zero are described in further detail with reference to FIGS. 2-5.

Figure 2:
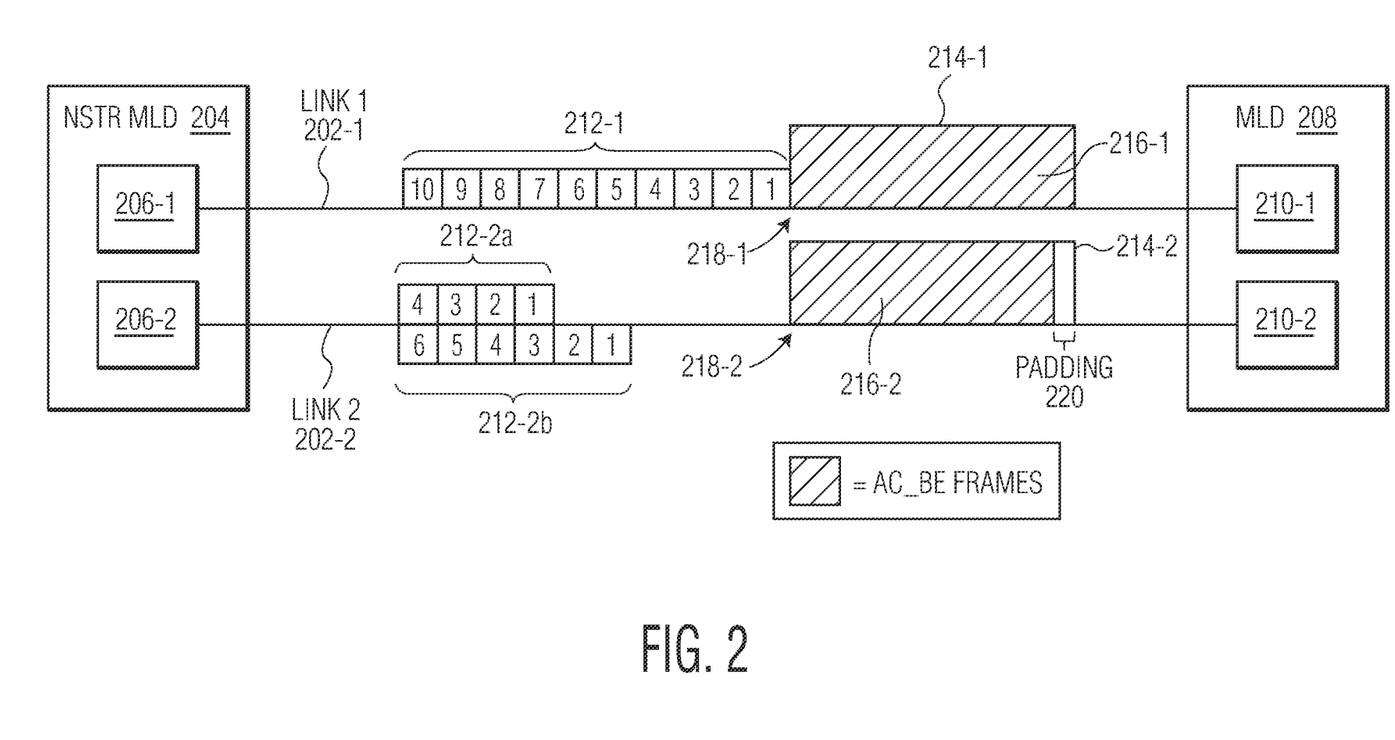
FIG. 2 illustrates an example of a technique that may be used by a multi-link device (MLD) that has a non-simultaneous transmission and reception capability (NSTR MLD) to simultaneously transmit Physical Layer Convergence Protocol (PLCP) Protocol Data Units (PPDUs) on multiple links.

FIG. 2 illustrates an example of a technique that may be used by an NSTR MLD 204 to simultaneously transmit PPDUs on multiple links. The NSTR MLD 204 communicates (e.g., exchanges frames and/or PPDUs) with an MLD, implemented as MLD 208, via two links, link1 202-1 and link2 202-2. In an embodiment, the NSTR MLD 204 includes two non-AP STAs, STA1 206-1 and STA2 206-2, and the MLD 208 includes two APs, AP1 210-1 and AP2 210-2. In such an embodiment, STA1 206-1 and AP1 210-1 communicate via link1 202-1, and STA2 206-2 and AP2 210-2 communicate via link2 202-2.

STA1 206-1 of the NSTR MLD 204 performs a first backoff operation on link1 202-1 where a first backoff counter 212-1 of the first backoff operation corresponds to AC_BE and has a value of ten (shown by ten slots included in the first backoff counter 212-1 on link1 202-1). After ten slots of idle medium, the backoff counter of AC_BE may become zero (e.g., after a slot with a value of one (shown by a slot that includes "1")). In addition, STA2 206-2 of the NSTR MLD 204 performs a second backoff operation on link2 202-2. The second backoff operation on link2 202-2 includes a first backoff counter 212-2a of the second backoff operation which corresponds to AC_VO and has a value of four (shown by four slots included in the first backoff counter 212-2a on link2 202-2), and includes a second backoff counter 212-2b of the second backoff operation which corresponds to AC_BE and has a value of six (shown by six slots included in the second backoff counter 212-2b on link2 202-2).

In an embodiment, on link2 202-2, the second backoff counter 212-2b of the second backoff operation becomes zero after the first backoff counter 212-2a of the second backoff operation becomes zero, such that the first backoff counter 212-2a of the second backoff operation and the second backoff counter 212-2b of the second backoff operation become zero at different times. In addition, the first backoff counter 212-1 of the first backoff operation becomes zero after the first backoff counter 212-2a of the second backoff operation and the second backoff counter 212-2b of the second backoff operation have become zero. Although the first backoff counter 212-2a of the second backoff operation and the second backoff counter 212-2b of the second backoff operation have different values (e.g., end at different slots), the first backoff counter 212-2a and the second backoff counter 212-2b may also have the same value.

After performing the first backoff operation on link1 202-1 and the second backoff operation on link2 202-2, the NSTR MLD 204 transmits a first PPDU 214-1 on link1 202-1 at a first start time 218-1 and a second PPDU 214-2 on link2 202-2 at a second start time 218-2. A difference between the first start time 218-1 and the second start time 218-2 may be no more than aRxTxTurnaroundTime or 4 µs. In an embodiment, STA2 206-2 of the NSTR MLD 204 can select any AC (whose backoff counter become zero during a time spent waiting for a backoff counter of STA1 206-1 to become zero) as a primary AC, such that STA2 206-2 transmits frames in a PPDU based on the primary AC selected. For example, the first PPDU 214-1 includes a first Aggregated-MPDU (A-MPDU) 216-1 with frames from a first AC (i.e., AC_BE (whose backoff counter is zero) as the primary AC) and the second PPDU 214-2 includes a second A-MPDU 216-2 with frames from a second AC (i.e., AC_BE (whose backoff counter is zero) as the primary AC). In such an embodiment, the second PPDU 214-2 also includes padding 220 after the second A-MPDU 216-2 to allow the two PPDUs, 214-1 and 214-2, to have the same length (if the second A-MPDU 216-2 is not enough). Although the second PPDU 214-2 is shown as including the second A-MPDU 216-2 with frames from AC_BE, STA2 206-2 can also select AC_VO as the primary AC so that the second A-MPDU 216-2 includes frames from AC_VO.

With reference to FIG. 2, because the first backoff counter 212-2a of the second backoff operation and the second backoff counter 212-2b of the second backoff operation are zero when the first backoff counter 212-1 of the first backoff operation becomes zero, STA2 206-2 can select any AC whose corresponding backoff counter on link2 202-2 is zero (e.g., AC_BE or AC_VO) as the primary AC for frame transmission, i.e., the second A-MPDU 216-2 included in the second PPDU 214-2 may be from any AC whose corresponding backoff counter on link2 202-2 is zero (e.g., AC_BE or AC_VO). In an embodiment, a flexible primary AC selection can avoid including the padding 220 in the second PPDU 214-2 (not shown). In another embodiment, a Transmission Opportunity (TXOP) holder on link2 202-2 can select frames from an AC whose TXOP limit is the same as a TXOP limit on link1 202-1.

Although FIG. 2 is shown as including backoff counters and frames which correspond to AC_BE and/or AC_VO, the backoff counters and the frames are not limited to AC_BE and/or AC_VO, and may be AC_VI, AC_BK, or any combination thereof. In addition, although one backoff counter is shown on link1 202-1 and two backoff counters are shown on link2 202-2, each link may include four backoff counters which correspond to the four access categories, e.g., AC_VO, AC_VI, AC_BE, and AC_BK. Furthermore, although the NSTR MLD 204 is described as including STAs and the MLD 208 is described as including APs, alternatively, the NSTR MLD 204 may include APs and the MLD 208 may include STAs. In addition, the NSTR MLD 204 and the MLD 208 may both be non-AP MLDs.

Figure 3:
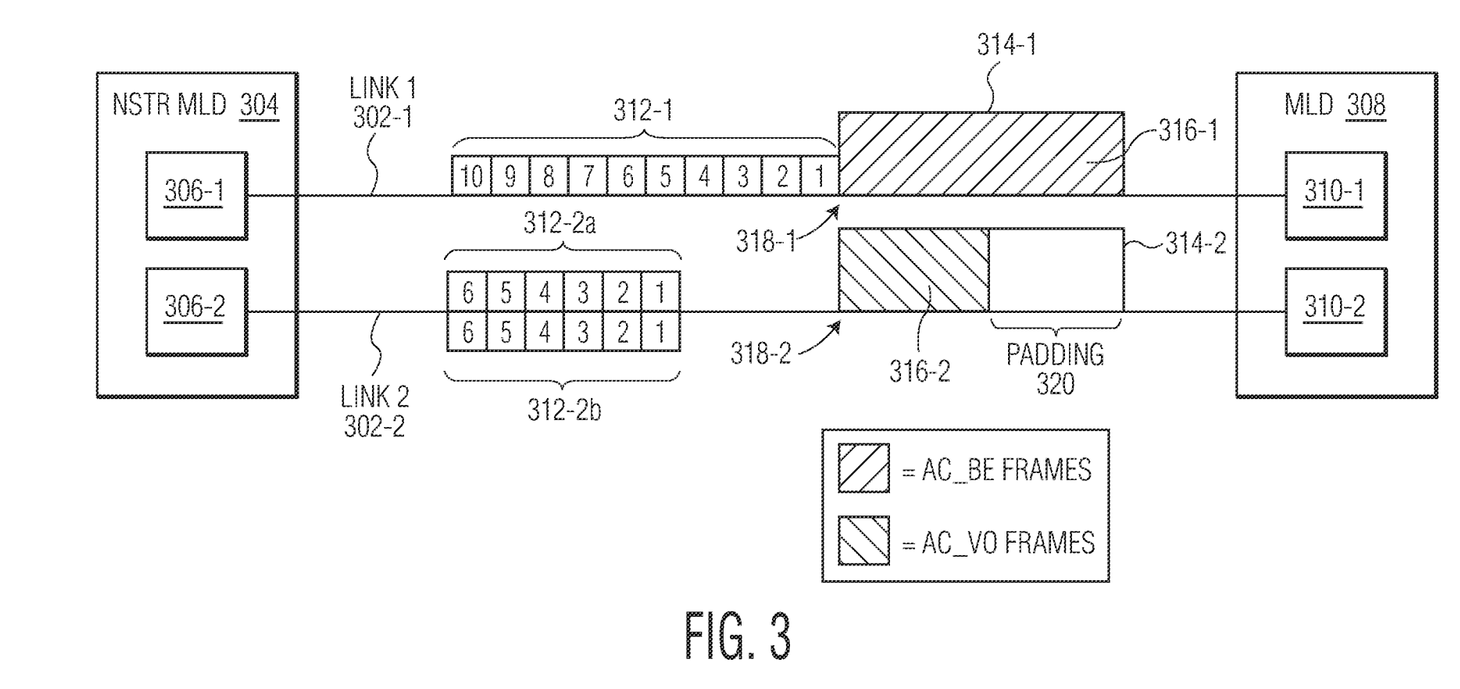
FIG. 3 illustrates another example of a technique that may be used by an NSTR MLD to simultaneously transmit PPDUs on multiple links.

FIG. 3 illustrates another example of a technique that may be used by an NSTR MLD 304 to simultaneously transmit PPDUs on multiple links. The NSTR MLD 304 includes STA1 306-1 and STA2 306-2 and communicates via link1 302-1 and link2 302-2 with an MLD 308 that includes AP1 310-1 and AP2 310-2 as previously described with reference to FIG. 2. In addition, the NSTR MLD 304 transmits a first PPDU 314-1 that includes a first A-MPDU 316-1 with frames from a first AC as a primary AC (i.e., AC_BE (whose backoff counter is zero) as the primary AC) on link1 302-1 at a first start time 318-1 and a second PPDU 314-2 that includes a second A-MPDU 316-2 with frames from a second AC as a primary AC (e.g., AC_VO) and padding 320 on link2 302-2 at a second start time 318-2 after STA1 306-1 of the NSTR MLD 304 performs a first backoff operation on link1 302-1 that includes a first backoff counter 312-1 of the first backoff operation, and STA2 306-2 of the NSTR MLD 304 performs a second backoff operation on link2 302-2 that includes a first backoff counter 312-2a of the second backoff operation and includes a second backoff counter 312-2b of the second backoff operation, similar to the technique as previously described with reference to FIG. 2.

However, as shown in FIG. 3, the first backoff counter 312-2a of the second backoff operation becomes zero at a same time as the second backoff counter 312-2b of the second backoff operation, such that the first backoff counter 312-2a of the second backoff operation has a value of six (shown by six slots included in the first backoff counter 312-2a on link2 302-2). In addition, the second A-MPDU 316-2 with frames included in the second PPDU 314-2 corresponds to AC_VO. The second A-MPDU 316-2 with frames included in the second PPDU 314-2 corresponds to AC_VO because the technique used by the NSTR MLD 304 to simultaneously transmit PPDUs on multiple links involves the second A-MPDU 316-2 with frames corresponding to an AC with highest priority (e.g., AC_VO) and whose backoff counter on link2 302-2 is zero. As an example, the order of priority for the four access categories from highest priority to lowest priority is AC_VO (highest priority), AC_VI, AC_BE, then AC_BK (lowest priority).

Figure 4:
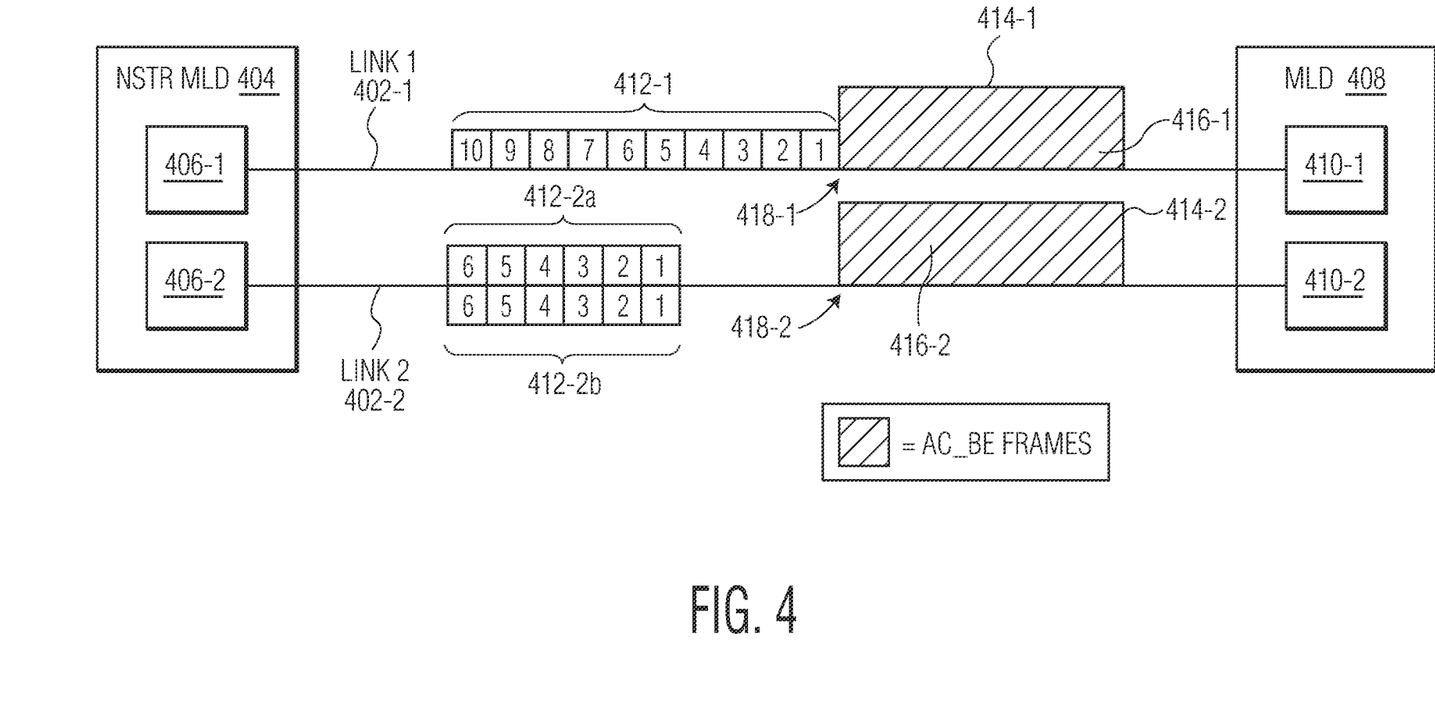
FIG. 4 illustrates another example of a technique that may be used by an NSTR MLD to simultaneously transmit PPDUs on multiple links.

FIG. 4 illustrates another example of a technique that may be used by an NSTR MLD 404 to simultaneously transmit PPDUs on multiple links. The NSTR MLD 404 includes STA1 406-1 and STA2 406-2 and communicates via link1 402-1 and link2 402-2 with an MLD 408 that includes AP1 410-1 and AP2 410-2 as previously described with reference to FIG. 2. In addition, the NSTR MLD 404 transmits a first PPDU 414-1 that includes a first A-MPDU 416-1 with frames from a first AC (i.e., AC_BE (whose backoff counter is zero) as the primary AC) on link1 402-1 at a first start time 418-1 and a second PPDU 414-2 that includes a second A-MPDU 416-2 with frames from a second AC (i.e., AC_BE (whose backoff counter is zero) as the primary AC) on link2 402-2 at a second start time 418-2 after STA1 406-1 of the NSTR MLD 404 performs a first backoff operation on link1 402-1 that includes a first backoff counter 412-1 of the first backoff operation, and STA2 406-2 of the NSTR MLD 404 performs a second backoff operation on link2 402-2 that includes a first backoff counter 412-2a of the second backoff operation and includes a second backoff counter 412-2b of the second backoff operation, similar to the technique as previously described with reference to FIG. 3.

In an embodiment, if a STA (e.g., STA2 406-2) has multiple backoff counters that become zero while deferring its TXOP until a backoff counter of another link (e.g., backoff counter 412-1 on link1 402-1) becomes zero, then the STA may need to perform a new backoff for an AC whose frames were not transmitted in the PPDU on the second link (e.g., the second PPDU 414-2 on link2 402-2). For example, STA2 402-2 may perform another backoff operation because the second PPDU 414-2 did not include frames from AC_VO, such that rules may need to be defined for a CW of AC_VO (CW[AC_VO]) and a QSRC of AC_VO (QSRC[AC_VO]).

In one embodiment, the NSTR MLD 404 may perform another backoff operation (not shown) on link2 402-2 for an AC (e.g., AC1) whose frames were not included in the second PPDU 414-2 and whose backoff counter became zero at a same time (shown) or at a different time (not shown) as another AC (e.g., AC2) whose frames were included in the second PPDU 414-2, such that a CW of AC1 (CW[AC1]) and a QSRC of AC1 (QSRC[AC1]) are unchanged for AC1, whose frames were not included. For example, because the second A-MPDU 416-2 with frames included in the second PPDU 414-2 corresponds to AC_BE, the other backoff operation would be for AC_VO, such that the CW[AC_VO] and the QSRC[AC_VO] may be unchanged.

In such an embodiment, if multiple backoff counters of a link (e.g., the first backoff counter 412-2a of the second backoff operation and the second backoff counter 412-2b of the second backoff operation on link2 402-2) are zero when a backoff counter of another link (e.g., the first backoff counter 412-1 of the first backoff operation on link1 402-1) becomes zero, the backoff counter of link2 402-2 whose frames were not included in a PPDU (e.g., the second PPDU 414-2) simultaneously transmitted with another PPDU (e.g., the first PPDU 414-1) on link1 402-1 performs a new backoff operation where its CW[AC] and QSRC[AC] are unchanged. As an example, the new backoff operation may start at the second start time 418-2 where a current CW[AC] and a current QSRC[AC] of AC_VO (whose frames were not included) are used for the new backoff operation.

In another embodiment, after a TXOP that includes the transmission of the second PPDU 414-2, the NSTR MLD 404 may perform another backoff operation (not shown) on link2 402-2 for an AC whose frames were not included in the second PPDU 414-2 and whose backoff counter became zero at a same time as another AC whose frames were included in the second PPDU 414-2, such that a QSRC[AC] is increased by one and a CW[AC] is doubled if the CW[AC] is less than a CWmax[AC] for the AC whose frames were not included. For example, because the second A-MPDU 416-2 with frames included in the second PPDU 414-2 corresponds to AC_BE, the other backoff operation would be for AC_VO, such that the QSRC[AC_VO] is increased by one and the CW[AC_VO] is doubled if the CW[AC] is less than a CWmax[AC] for AC_VO.

In such an embodiment, if multiple backoff counters of a link (e.g., the first backoff counter 412-2a of the second backoff operation and the second backoff counter 412-2b of the second backoff operation on link2 402-2) are zero when a backoff counter of another link (e.g., the first backoff counter 412-1 of the first backoff operation on link1 402-1) becomes zero, the backoff counter of link2 402-2 whose frames were not included in a PPDU (e.g., the second PPDU 414-2) simultaneously transmitted with another PPDU (e.g., the first PPDU 414-1) on link1 402-1 performs a new backoff operation where its QSRC[AC] is increased by one and CW[AC] is doubled if the CW[AC] is less than a CWmax[AC]. In some embodiments, the CW[AC] could be set to a CWmin[AC] if the QSRC[AC] that is increased by one reaches a threshold value. As an example, the new backoff operation may start at the second start time 418-2 after a CW[AC] and a QSRC[AC] of AC_VO is doubled and increased by one, respectively.

Figure 5:
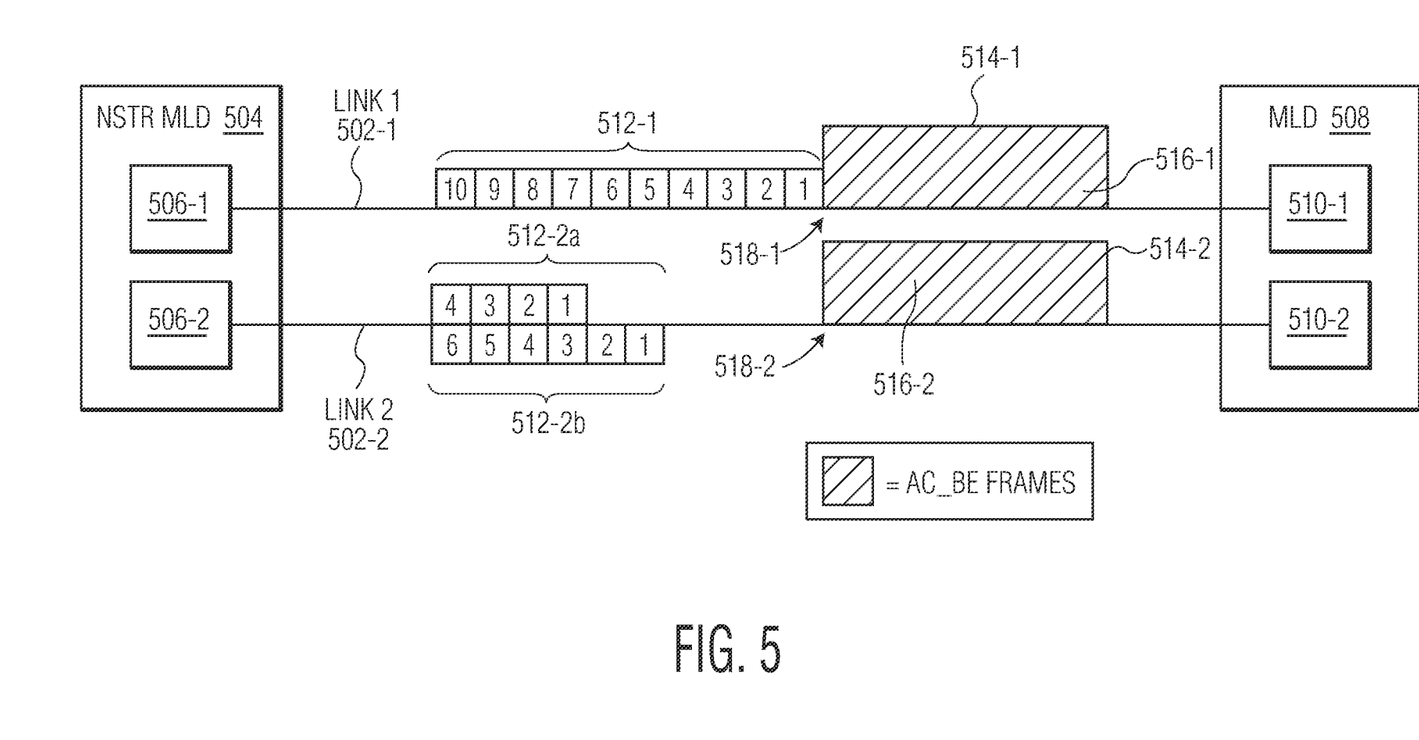
FIG. 5 illustrates another example of a technique that may be used by an NSTR MLD to simultaneously transmit PPDUs on multiple links.

FIG. 5 illustrates another example of a technique that may be used by an NSTR MLD 504 to simultaneously transmit PPDUs on multiple links. The NSTR MLD 504 includes STA1 506-1 and STA2 506-2 and communicates via link1 502-1 and link2 502-2 with an MLD 508 that includes AP1 510-1 and AP2 510-2 as previously described with reference to FIG. 2. In addition, the NSTR MLD 504 transmits a first PPDU 514-1 that includes a first A-MPDU 516-1 with frames from a first AC (i.e., AC_BE (whose backoff counter is zero) as the primary AC) on link1 502-1 at a first start time 518-1 and a second PPDU 514-2 that includes a second A-MPDU 516-2 with frames from a second AC (i.e., AC_BE (whose backoff counter is zero) as the primary AC) on link2 502-2 at a second start time 518-2 after STA1 506-1 of the NSTR MLD 504 performs a first backoff operation on link1 502-1 that includes a first backoff counter 512-1 of the first backoff operation, and STA2 506-2 of the NSTR MLD 504 performs a second backoff operation on link2 502-2 that includes a first backoff counter 512-2a of the second backoff operation and includes a second backoff counter 512-2b of the second backoff operation, similar to the technique as previously described with reference to FIG. 4.

However, as shown in FIG. 5, the first backoff counter 512-2a of the second backoff operation and the second backoff counter 512-2b of the second backoff operation become zero at different times, such that the first backoff counter 512-2a of the second backoff operation has a value of four (shown by four slots included in the first backoff counter 512-2a on link2 502-2) and the second backoff counter 512-2b of the second backoff operation has a value of six (shown by six slots included in the second backoff counter 512-2b on link2 502-2). In an embodiment, STA2

502-2 may perform another backoff operation because the second PPDU 514-2 did not include frames from AC_VO, such that rules may need to be defined for a CW[AC_VO] and a QSRC[AC_VO] when the backoff counters on a link (e.g., link2 502-2) end at different times.

In one embodiment, the NSTR MLD 504 may perform another backoff operation (not shown) on link2 502-2 for an AC (e.g., AC1) whose frames were not included in the second PPDU 514-2 and whose backoff counter became zero at a different time (shown) or at a same time (not shown) from another AC (e.g., AC2) whose frames were included in the second PPDU 514-2, such that a QSRC [AC1] is increased by one and a CW[AC1] is doubled if the CW[AC1] is less than a CWmax[AC1] for AC1, whose frames were not included. In another embodiment, after transmission of the second PPDU 514-2, the NSTR MLD 504 may perform another backoff operation (not shown) on link2 502-2 for AC1, whose frames were not included in the second PPDU 514-2, and whose backoff counter became zero at a different time from AC2, whose frames were included in the second PPDU 514-2, such that a CW[AC1] and a QSRC[AC1] are unchanged for AC1.

Similar backoff operations as previously described may also be implemented by an NSTR MLD to break a deadlock on multiple links. An example of a deadlock that occurs on multiple links is described in further detail with reference to FIG. 6.

Figure 6:
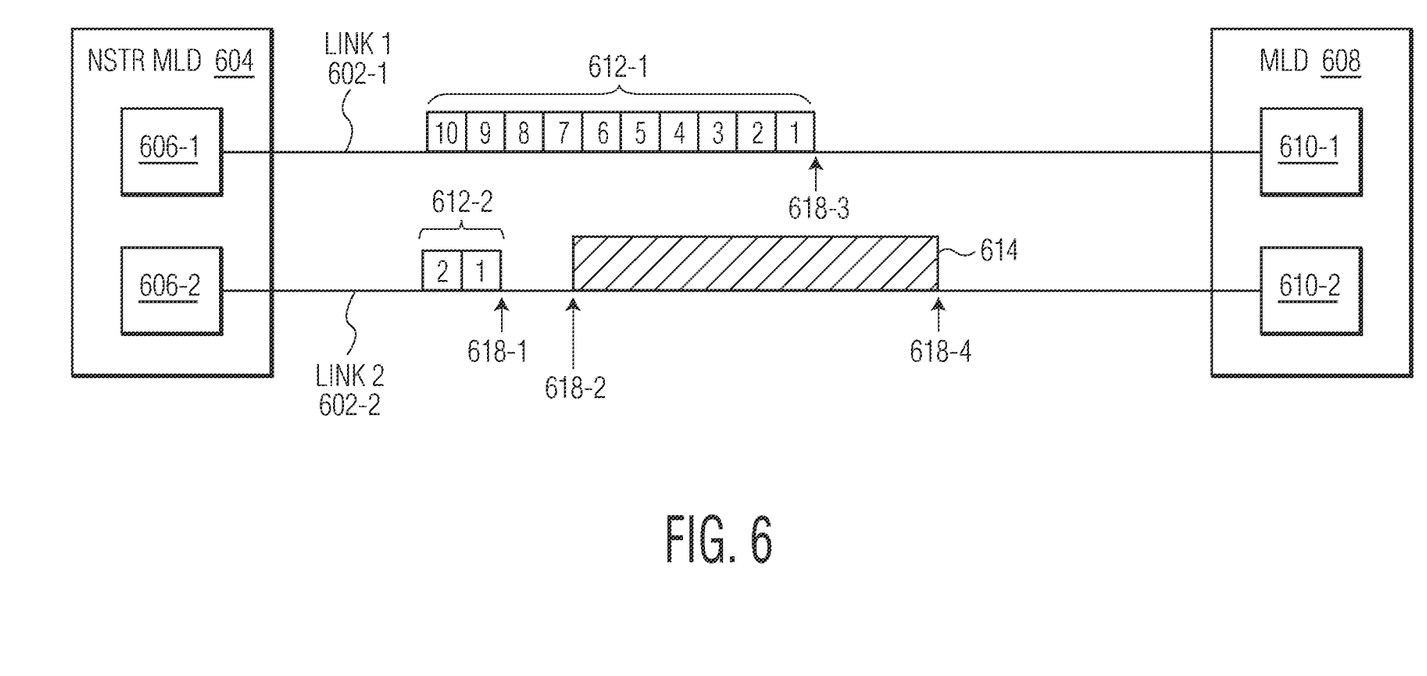
FIG. 6 illustrates an example of a deadlock that occurs on multiple links.

FIG. 6 illustrates an example of a deadlock that occurs on multiple links. In the embodiment of FIG. 6, an NSTR MLD 604 includes STA1 606-1 and STA2 606-2 and communicates via link1 602-1 and link2 602-2 with an MLD 608 that includes AP1 610-1 and AP2 610-2 as previously described with reference to FIG. 2.

STA1 606-1 of the NSTR MLD 604 performs a first backoff operation on link1 602-1 where a first backoff counter 612-1 of the first backoff operation corresponds to a first AC (e.g., AC_BE) and has a value of ten (shown by ten slots included in the first backoff counter 612-1 on link1 602-1). In addition, STA2 606-2 of the NSTR MLD 604 performs a second backoff operation on link2 602-2 where a first backoff counter 612-2 of the second backoff operation corresponds to a second AC (e.g., AC_VO) and has a value of two (shown by two slots included in the first backoff counter 612-2 on link2 602-2).

In an embodiment, the first backoff counter 612-2 of the second backoff operation becomes zero at a first time 618-1, such that link2 602-2 starts waiting for the first backoff counter 612-1 of the first backoff operation on link1 602-1 to become zero. At a second time 618-2, link2 602-2 becomes busy and begins a busy period 614. During the busy period 614 on link2 602-2, the first backoff counter 612-1 of the first backoff operation on link1 602-1 becomes zero at a third time 618-3, at which link1 602-1 starts waiting for link2 602-2 to have a backoff counter become zero. At a fourth time 618-4, the busy period 614 ends and link2 602-2 starts waiting for link1 602-1 to have a backoff counter become zero. However, when link1 602-1 and link2 602-2 are both waiting for backoff counters to become zero, a deadlock occurs. As an example, during "deadlock", the two links, 602-1 and 602-2, may not be used for frame exchanges by STA1 606-1 and STA2 606-2 of the NSTR MLD 604.

To break the deadlock and allow frame exchanges, the NSTR MLD 604 may implement a technique as described herein. In one embodiment, breaking the deadlock may involve another backoff operation being performed on link2 602-2 once a backoff counter on link1 602-1 becomes zero.

In another embodiment, breaking the deadlock may involve another backoff operation being performed on link2 602-2 once link2 602-2 becomes idle. In such embodiment, after the deadlock is broken, the NSTR MLD 604 may transmit PPDUs on link1 602-1 and/or link2 602-2.

Figure 7:
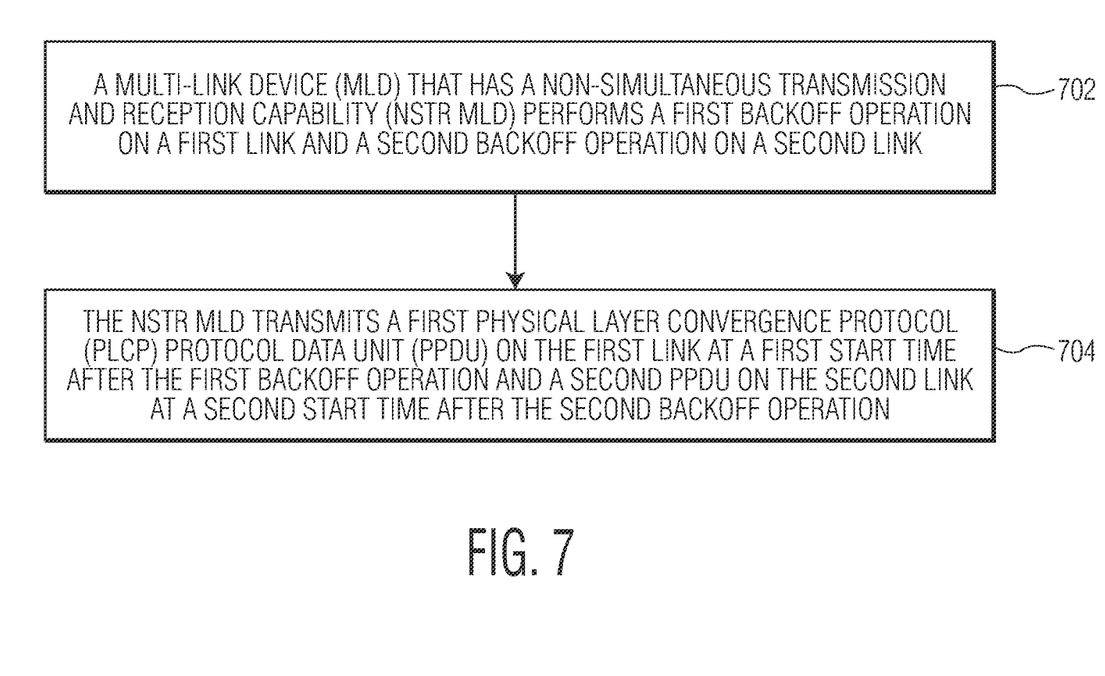
FIG. 7 illustrates a flow diagram of a technique for multi-link operations in accordance with an embodiment of the invention.

FIG. 7 illustrates a flow diagram of a technique for multi-link operations in accordance with an embodiment of the invention. At block 702, an NSTR MLD performs a first backoff operation on a first link and a second backoff operation on a second link. At block 704, the NSTR MLD transmits a first PPDU on the first link at a first start time after the first backoff operation and a second PPDU on the second link at a second start time after the second backoff operation.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device comprising:
 a processor configured to:
  perform a first backoff operation on a first link and a second backoff operation on a second link of a multi-link device (MLD) that has a non-simultaneous transmission and reception capability (NSTR MLD); and
  transmit a first Physical Layer Convergence Protocol (PLCP) Protocol Data Unit (PPDU) on the first link at a first start time after the first backoff operation and a second PPDU on the second link at a second start time after the second backoff operation.

2. The device of claim 1, wherein a difference between the first start time and the second start time is no more than a Receive-Transmit Turnaround Time (aRxTxTurnaroundTime).

3. The device of claim 1, wherein a difference between the first start time and the second start time is no more than 4 microseconds (p).

4. The device of claim 1, wherein a first backoff counter of the first backoff operation becomes zero after a first backoff counter of the second backoff operation and a second backoff counter of the second backoff operation have become zero.

5. The device of claim 4, wherein the first backoff counter of the second backoff operation and the second backoff counter of the second backoff operation become zero at different times.

6. The device of claim 4, wherein the first backoff counter of the second backoff operation and the second backoff counter of the second backoff operation become zero at a same time.

7. The device of claim 1, wherein the first PPDU includes a first Aggregated-Media Access Control (MAC) Protocol Data Unit (MPDU) (A-MPDU) with frames from a first Access Category (AC), and the second PPDU includes a second A-MPDU with frames from a second AC.

8. The device of claim 7, wherein the processor is configured to perform another backoff operation on the second link for an AC that is not included in the second PPDU, and wherein a Contention Window (CW) of the AC (CW[AC]) and a Quality of Service (QoS) Short Reply Counter (QSRC) of the AC (QSRC[AC]) are unchanged.

9. The device of claim 7, wherein the processor is configured to perform another backoff operation on the second link for an AC that is not included in the second PPDU after a QSRC[AC] is increased by one and a CW[AC] is doubled.

10. The device of claim 9, wherein the CW[AC] is doubled if the CW[AC] is less than a max CW of the AC (CWmax[AC]).

11. The device of claim 9, wherein the CW[AC] is set to a minimum CW of the AC (CWmin[AC]) if the QSRC[AC] reaches a threshold value.

12. The device of claim 1, wherein a first backoff counter of the first backoff operation becomes zero after a first backoff counter of the second backoff operation and a second backoff counter of the second backoff operation have become zero; and
wherein the first PPDU includes a first A-MPDU with frames from a first AC and the second PPDU includes a second A-MPDU with frames from a second AC.

13. The device of claim 12, wherein the second A-MPDU with frames from the second AC corresponds to at least one of the first backoff counter of the second backoff operation and the second backoff counter of the second backoff operation.

14. The device of claim 1, wherein the processor is configured to perform another backoff operation on the second link once a backoff counter on the first link becomes zero to break a deadlock that occurs after the first backoff operation and the second backoff operation.

15. The device of claim 1, wherein the processor is configured to perform another backoff operation on the second link once the second link becomes idle to break a deadlock that occurs after the first backoff operation and the second backoff operation.

16. The device of claim 1, wherein the first backoff operation includes a backoff counter for a corresponding AC and the second backoff operation includes another backoff counter for another corresponding AC.

17. The device of claim 1, wherein the device includes:
a first station (STA), STA1, that performs the first backoff operation on the first link; and
a second STA, STA2, that performs the second backoff operation on the second link.

18. The device of claim 1, wherein the processor is configured to operate according to an Institute of Electrical and Electronics Engineers (IEEE) 802.11be communication protocol.

19. A method of multi-link operations, the method comprising:
performing, by a multi-link device (MLD) that has a non-simultaneous transmission and reception capability (NSTR MLD), a first backoff operation on a first link and a second backoff operation on a second link; and
transmitting, by the NSTR MLD, a first Physical Layer Convergence Protocol (PLCP) Protocol Data Unit (PPDU) on the first link at a first start time after the first backoff operation and a second PPDU on the second link at a second start time after the second backoff operation.

20. A method of multi-link operations, the method comprising:
performing, by a multi-link device (MLD) that has a non-simultaneous transmission and reception capability (NSTR MLD), a first backoff operation on a first link and a second backoff operation on a second link, wherein performing the first backoff operation and the second backoff operation includes:
a first station (STA), STA1, performing the first backoff operation on the first link; and
a second STA, STA2, performing the second backoff operation on the second link; and
transmitting, by STA1 and STA2, a first Physical Layer Convergence Protocol (PLCP) Protocol Data Unit (PPDU) on the first link at a first start time after the first backoff operation and a second PPDU on the second link at a second start time after the second backoff operation.

* * * * *